United States Patent [19]
Grantland

[11] 4,442,322
[45] Apr. 10, 1984

[54] ELECTRONIC COMMON SWITCH HAVING AN IMPROVED RECEIVER MATING ARRANGEMENT

[75] Inventor: Gary Grantland, Hartselle, Ala.

[73] Assignee: GTE Automatic Electric Inc., Northlake, Ill.

[21] Appl. No.: 395,885

[22] Filed: Jul. 7, 1982

[51] Int. Cl.³ ............................................. H04M 1/26
[52] U.S. Cl. ............................. 179/81 R; 179/84 VF
[58] Field of Search .............. 179/81 R, 84 VF, 99 E, 179/90 K, 167

[56] References Cited

U.S. PATENT DOCUMENTS 4,087,638  5/1978  Hayes et al. ............... 179/84 VF X
4,315,108  2/1982  Hoffman et al. ............ 179/84 VF
4,332,984  6/1982  Davis et al. ............... 179/81 R Primary Examiner—A. D. Pellinen
Assistant Examiner—Keith E. George
Attorney, Agent, or Firm—Anthony Miologos; Robert J. Black

[57] ABSTRACT

In a telephone substation employing a dual tone multifrequency signal generator, the common switch functions of disabling the transmitter and muting the receiver are performed by transistor devices responsive to a control signal produced by the signal generator. A bias voltage provided by the transistor device associated with the transmitter prevents dialing signals from reverse biasing the transistor device associated with the receiver and defeating receiver muting.

5 Claims, 1 Drawing Figure

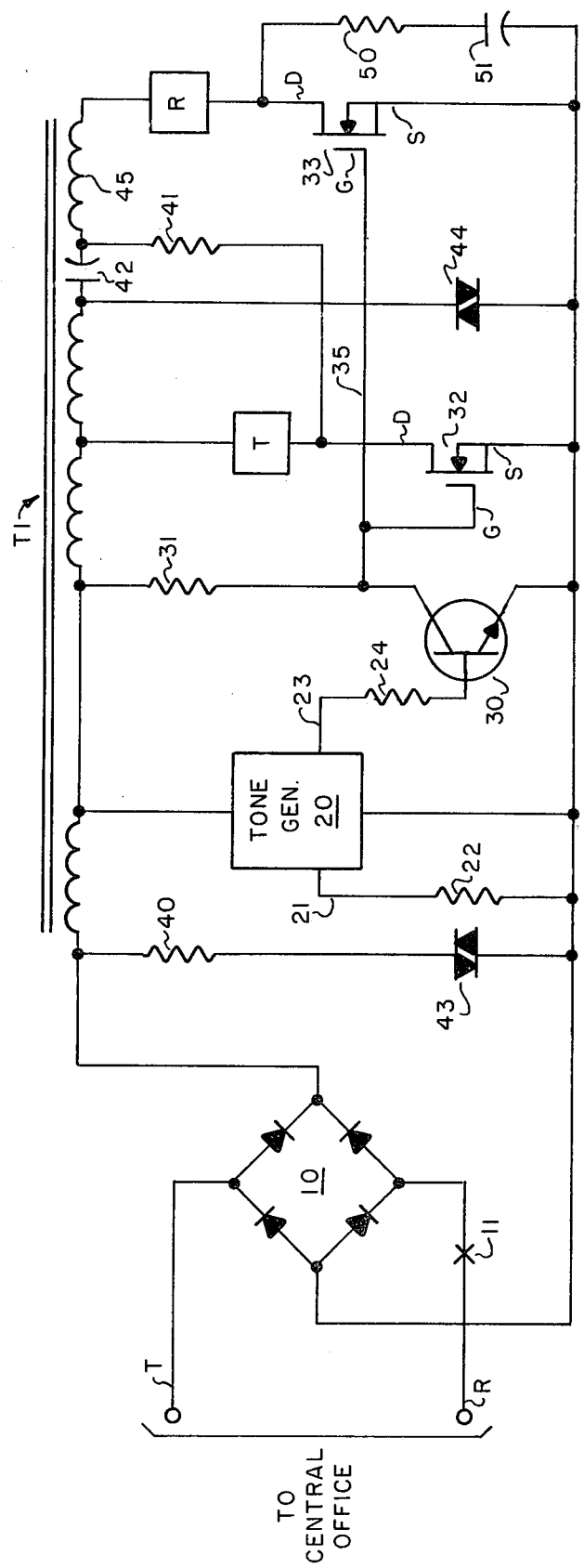

ELECTRONIC COMMON SWITCH HAVING AN IMPROVED RECEIVER MATING ARRANGEMENT

BACKGROUND OF THE INVENTION (1) Field of the Invention

This invention relates in general to telephone substation equipment and more particularly to a method of muting the telephone receiver during manual or repertory dual tone multi-frequency signaling.

(2) Description of the Prior Art

Previous methods used to remove the transmitter and mute the receiver of a telephone substation during dual tone multi-frequency (DTMF) signaling utilized one or more successive spring contacts mechanically actuated when any DTMF keypad button was operated. These spring contacts or common switch remove the transmitter from the transmission network and mute the DTMF tone level into the receiver. This method works well when manually dialing but when a repertory dialing feature is required, the muting of the receiver and the disconnecting of the transmitter cannot be accomplished since the common switch springs are not activated.

Earlier models of repertory dialers made use of commercial power rather than telephone line power and therefore used relays in conjunction with the common switch springs to provide the muting function. Repertory dialers which are restricted to using telephone line power do not receive enough power from the line to drive relays.

One method of providing the muting function in line powered telephones is to use solid state switches employing bipolar transistors in series or in parallel with the receiver. A problem with bipolar transistors connected in series with the receiver is that they do not provide a low enough resistance in the "ON" condition to prevent loss of receive level in the unmuted condition. Additionally, when connected in parallel with the receiver, the bipolar devices do not have a low enough saturation voltage to provide adequate muting of DTMF levels.

Finally, since the receiver is DC isolated, no DC current passes through the transistor which provides receiver muting. DTMF tone levels at the receiver are sufficient in amplitude that without a sufficient DC bias the tone levels can reverse bias the transistor and defeat the muting.

SUMMARY OF THE INVENTION

The electronic common switch of the present invention incorporates the use of three transistors included within an induction coil transmission circuit. The transistors turn "ON" or "OFF" depending upon a mute signal provided by a dual tone multi-frequency tone generator. The DTMF tone generator provides the mute signal at a mute lead anytime the tone generator is in a tone mode. This mute output becomes present when manually dialing or repertory dialing. The mute output signal is normally LOW and goes HIGH during toning. A first transistor connected to the mute output lead turns on when the mute signal goes HIGH. Second and third transistor each connecting the transmitter and receiver respectively to the transmission network are turned off by the first transistor turning on. This effectively removes the transmitter and receiver from the transmission network each time the muting signals is activated.

When turned off the transistor associated with the transmitter provides a DC bias to the receiver transistor. The bias is sufficient to prevent large DTMF tone levels from reverse biasing the third transistor and defeating the mute condition. A resistor and capacitor are provided in parallel across the third transistor to allow a portion of the DTMF tones to be coupled to the receiver as a pacifier tone.

DESCRIPTION OF THE DRAWING

The single sheet of drawings included herewith comprise a schematic diagram of the electronic common switch embodying the principles of operation of the present invention.

DESCRIPTION OF THE PREFERRED EMBODIMENT

The included drawing schematically shows the electronic common switch circuit and those elements well known and common to a subscriber's telephone substation which will hereinafter be described in detail.

A subscriber telephone station transmission circuit including transformer T1, transmitter T, receiver R and line balancing network comprised of resistors 40, 41; varistors 43, 44; and capacitor 42 are connected to a diode bridge network 10. The transmission circuit further includes an integrated circuit dual tone multi-frequency (DTMF) signaling generator 20 connected in parallel to the transmission circuit.

The special control circuitry and memory for storing telephone numbers usually found in repertory dialers is not illustrated here for matters of clarity. The inclusion of these elements to the transmission circuit and signal generator is well within the expertise of those skilled in the art.

Diode bridge 10 connects the transmission circuit to a central office and a central office battery, (not shown) via the tip (T) and ring (R) leads respectively of a subscriber's line. The ring lead includes a hookswitch contact 11 which is arranged to make, thereby completing the loop circuit from the central office and central office battery, to the subscriber line and transmission circuit. The loop circuit provides battery current from the central office to the subscriber station and signaling tones from the subscriber station to the central office.

The electronic common switch of the present invention is comprised of a transistor 30 having a base lead connected to a mute output lead 23 of tone generator 20 via a resistor 24. A current path is formed through the transistor and resistor 31 from one side of the transmission circuit to the other. First and second VMOS transistors 32 and 33 connect the transmitter and receiver respectively to the transmission circuit. The gate G of each transistor 32 and 33 is connected to a common lead 35. Lead 35 is connected to the collector lead of transistor 30. VMOS devices have been chosen for this application since they present a very low ON state resistance and a high input resistance at the gate. The high input resistance allows resistor 31 to be a large value thereby avoiding any degraded transmission performance.

It should be understood that hookswitch contact 11 is controlled by typical hookswitch mechanism which is manually operable into an operated or "off-hook" condition, i.e. when the handset is lifted off the subscriber station, or non-operated when "on-hook," i.e. when the handset is placed on the subscriber station.

A detailed description of the operation of the electronic common switch circuit will hereinafter be described in detail. It should be noted that the included drawing shows all contacts in their unoperated conditions. When the substation instrument is intended to be used the telephone handset is lifted placing the substation "off-hook", thus allowing contact 11 to make, connecting the transmission network to the central office, with the central office battery supplying loop current to the transmission circuit via diode bridge 10.

DTMF tone generator 20 provides a mute output via lead 23 anytime the tone generator is in a tone mode, i.e. when manually dialing or when a repertory dialing feature is used. The mute output is normally LOW and goes HIGH during toning. Transistor 30 is normally off, and transistors 32 and 33 are normally on connecting the transmitter receiver respectfully across the transmission circuit. It should be noted that in typical transmission circuits balancing resistor 41 is connected directly to the negative side of the diode bridge. As can be seen on the schematic drawing receiver 41 in this application is connected to the D lead of transistor 32 and becomes disconnected from the diode bridge during signaling.

When the DTMF signal generator 20 is operated as when depressing a pushbutton during manual dialing or allowing the tone generator to automatically dial a stored number as in repertory dialing the mute lead 23 goes HIGH turning transistor 30 on. With transistor 30 on, loop current flows through transistor 30 and resistor 31 from one side of the transmission circuit to the other. As transistor 30 turns on lead 35 assumes a LOW condition coupling the LOW to each gate of transistors 32 and 33. This effectively turns off transistors 32 and 33 and disconnects the transmitter and receiver respectively from the transmission circuit. The drain lead D of transistor 32 goes HIGH when transistor 32 is turned off. This provides a DC bias to the drain lead D of transistor 33 via resistor 41, T1 winding 45 and receiver R. The DC bias provided is sufficient to prevent large DTMF tone levels coupled to the transmission circuit via lead 21 and resistor 22 from reverse biasing the drain D to source S leads of transistor 33 and defeating the mute condition. A portion of the DTMF tones are by-passed around transistor 33 via resistor 50 and capacitor 51 and coupled to the receiver as a pacifier tone for the subscriber providing an audio indicator that signals are being outputed.

Although the best mode contemplated for carrying out the present invention has been herein shown and described, it will be apparent that modifications and variations may be made without departing from what is regarded as a subject matter of the invention.

What is claimed is:

1. In a telephone substation, employing multi-frequency dialing, in combination, a speech network including a resistive path, a transmitter, a receiver and a signal generator, said signal generator arranged to produce a control signal and dialing signals to said speech network responsive to said signal generator being operated, a first transistor connected to said speech network arranged to turn on responsive to said control signal, a second transistor disconnecting said transmitter from said speech network responsive to said first transistor turning on, said second transistor further connected to said speech network via said resistive path, and a third transistor disconnecting said receiver from said speech network responsive to said first transistor turning on, said second transistor providing a bias voltage to said third transistor via said resistive path preventing said third transistor from being reverse biased by said dialing signals and reconnecting said receiver.

2. The arrangement in accordance with claim 1, wherein: said first transistor base lead is connected to said signal generator and its emitter-collector path is connected across said speech network, said emitter-collector path providing a current path across said network when said first transistor turns on.

3. The arrangement in accordance with claim 2, wherein: said second and third transistors are VMOS transistors and each of said VMOS transistors includes a drain-source path connecting said transmitter and receiver respectively across said speech network, each of said VMOS transistors further including a gate lead and each gate lead is connected to said first transistor emitter-collector path whereby in response to said first transistor turning on said second and third transistors turn off disconnecting said transmitter and receiver from said speech network.

4. The arrangement in accordance with claim 3, wherein: said resistive path connects said first transistors drain lead to said second transistors drain lead via a portion of said speech network and said receiver, thereby providing a bias voltage to said third transistor from said second transistor preventing said third transistor from being reverse biased by said dialing signals.

5. The arrangement in accordance with claim 1, wherein: said speech network further includes a dialing signal continuation path connected in parallel across said third transistor allowing for a portion of the dialing signals to be connected to said receiver.

* * * * *

UNITED STATES PATENT AND TRADEMARK OFFICE
CERTIFICATE OF CORRECTION

PATENT NO. : 4,442,322
DATED : April 10, 1984
INVENTOR(S) : Gary Grantland

It is certified that error appears in the above-identified patent and that said Letters Patent are hereby corrected as shown below:

Title line, "Mating" should be --Muting--

Signed and Sealed this

Fourteenth Day of August 1984

[SEAL]

Attest:

GERALD J. MOSSINGHOFF

Attesting Officer

Commissioner of Patents and Trademarks